United States Patent
Suthar et al.

(10) Patent No.: US 12,380,316 B2
(45) Date of Patent: Aug. 5, 2025

(54) ASSURANCE OF POLICY BASED ALERTING

(71) Applicant: Cisco Technology, Inc., San Jose, CA (US)

(72) Inventors: Om Prakash Suthar, Bolingbrook, IL (US); Anwin P. Kallumpurath, Shrewsbury, MA (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1100 days.

(21) Appl. No.: 16/172,758

(22) Filed: Oct. 27, 2018

(65) Prior Publication Data

US 2020/0134421 A1    Apr. 30, 2020

(51) Int. Cl.
*G06N 3/045* (2023.01)
*G06F 11/30* (2006.01)
*G06N 3/044* (2023.01)
*G06N 3/088* (2023.01)
*G08B 21/18* (2006.01)

(52) U.S. Cl.
CPC ........... *G06N 3/045* (2023.01); *G06F 11/302* (2013.01); *G06N 3/044* (2023.01); *G06N 3/088* (2013.01); *G08B 21/182* (2013.01)

(58) Field of Classification Search
CPC .... G06N 3/0454; G06N 3/0445; G06N 3/088; G06F 11/302; G06F 11/0751; G06F 11/3409; G06F 11/3495; G08B 21/182
See application file for complete search history.

(56) References Cited

U.S. PATENT DOCUMENTS

| | | | | |
|---|---|---|---|---|
| 10,805,324 | B2 * | 10/2020 | Abbaszadeh | G06K 9/6293 |
| 2016/0219066 | A1 * | 7/2016 | Vasseur | H04L 63/1425 |
| 2018/0159879 | A1 * | 6/2018 | Mestha | G06N 3/084 |
| 2018/0270126 | A1 * | 9/2018 | Tapia | H04L 41/5032 |

(Continued)

OTHER PUBLICATIONS

Liu, Yezheng, et al. "Generative Adversarial Active Learning for Unsupervised Outlier Detection." arXiv preprint arXiv:1809.10816 (2018). (Year: 2018).*

(Continued)

*Primary Examiner* — Miranda M Huang
*Assistant Examiner* — Sidney Vincent Bostwick
(74) *Attorney, Agent, or Firm* — Patterson + Sheridan, LLP

(57) ABSTRACT

Embodiments provide for assuring policy based alerting, via clustering, via a first neural network, operational data reported from a network into a plurality of anomalies organized into several clusters; correlating, via the first neural network, alerts received from devices in the network according to the several clusters; determining, via the second neural network, anomaly impacts in the several clusters from the filtered alerts; in response to determining that the anomaly impacts for a first cluster exceed an alerting threshold: identifying a first shared node in the first cluster; identifying a second cluster including a second shared node matching the first shared node that has not been determined to exceed the alerting threshold; and transmitting an alert for the first cluster and the second cluster; and in response to receiving a response to the alert, updating, via the second neural network, the first neural network.

20 Claims, 5 Drawing Sheets

(56) References Cited

U.S. PATENT DOCUMENTS

| | | | | |
|---|---|---|---|---|
| 2018/0309636 A1* | 10/2018 | Strom | ............... | H04L 41/0813 |
| 2019/0228312 A1* | 7/2019 | Andoni | ............... | G06F 18/2433 |
| 2020/0007563 A1* | 1/2020 | Leibman | ............... | G06K 9/6247 |
| 2020/0112489 A1* | 4/2020 | Scherger | ............... | G06F 11/3466 |

OTHER PUBLICATIONS

Cabrera, João BD, Carlos Gutiérrez, and Raman K. Mehra. "Ensemble methods for anomaly detection and distributed intrusion detection in mobile ad-hoc networks." Information fusion 9.1 (2008): 96-119. (Year: 2008).*

Pividori, Milton, Georgina Stegmayer, and Diego H. Milone. "Cluster Ensembles for Big Data Mining Problems." Simposio Argentino de GRANdes DAtos (Agranda 2015)—JAIIO 44 (Rosario, 2015). 2015. (Year: 2015).*

Fitzgerald, Simon. Design and Implementation of a Distributed Neural Network Platform Utilising Crowdsource Processing. Diss. School of Engineering Design and Implementation of a Distributed Neural Network Platform . . . (Year: 2018).*

Didaci, Luca, Giorgio Giacinto, and Fabio Roli. "Ensemble learning for intrusion detection in computer networks." Workshop Machine Learning Methods Applications, Siena, Italy. 2002. (Year: 2002).*

Configure Machine Health Rules, Policies, and Alerts—4.2.x Documentation, Accessed Jan. 28, 2019, 2 pages (<https://docs.appdynamics.com/display/PRO42/Configure+Machine+Health+Rules%2C+Policies%2C+and+Alerts>).

"Keras LSTM tutorial—How to easily build a powerful deep learning language model", Feb. 3, 2018, Adventures In Machine Learning, 24 pages.

Martin Ester, Hans-Peter Kriegel, Jiirg Sander, Xiaowei Xu, "A Density-Based Algorithm for Discovering Clusters in Large Spatial Databases with Noise," KDD-96 Proceedings. 1996, 6 pages.

Robert Nau, "Notes on nonseasonal ARIMA models." Fuqua School of Business, Duke University, 2014, 21 pages.

* cited by examiner

ASSURANCE OF POLICY BASED ALERTING

TECHNICAL FIELD

Embodiments presented in this disclosure generally relate to network management. More specifically, embodiments disclosed herein provide novel uses of machine learning in managing alerts within a dynamic network.

BACKGROUND

In a network of computing devices, individual devices may be organized into hierarchies to perform various functions. As these hierarchies become increasingly complex, and the number and type of devices in the hierarchies fluctuate, data monitoring and analysis of the health of the network as a system also becomes increasing complex. Service providers maintain these networks by reacting to alerts generated by the various devices in the network, which are often based on device-specific conditions, predefined thresholds, and instantaneous measures of network health. These alerts may be provided in overwhelming numbers to the service providers that can mask underlying issues in the network, provide false positives, miss actual issues affecting the network, or misattribute where the source of an issue lies.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
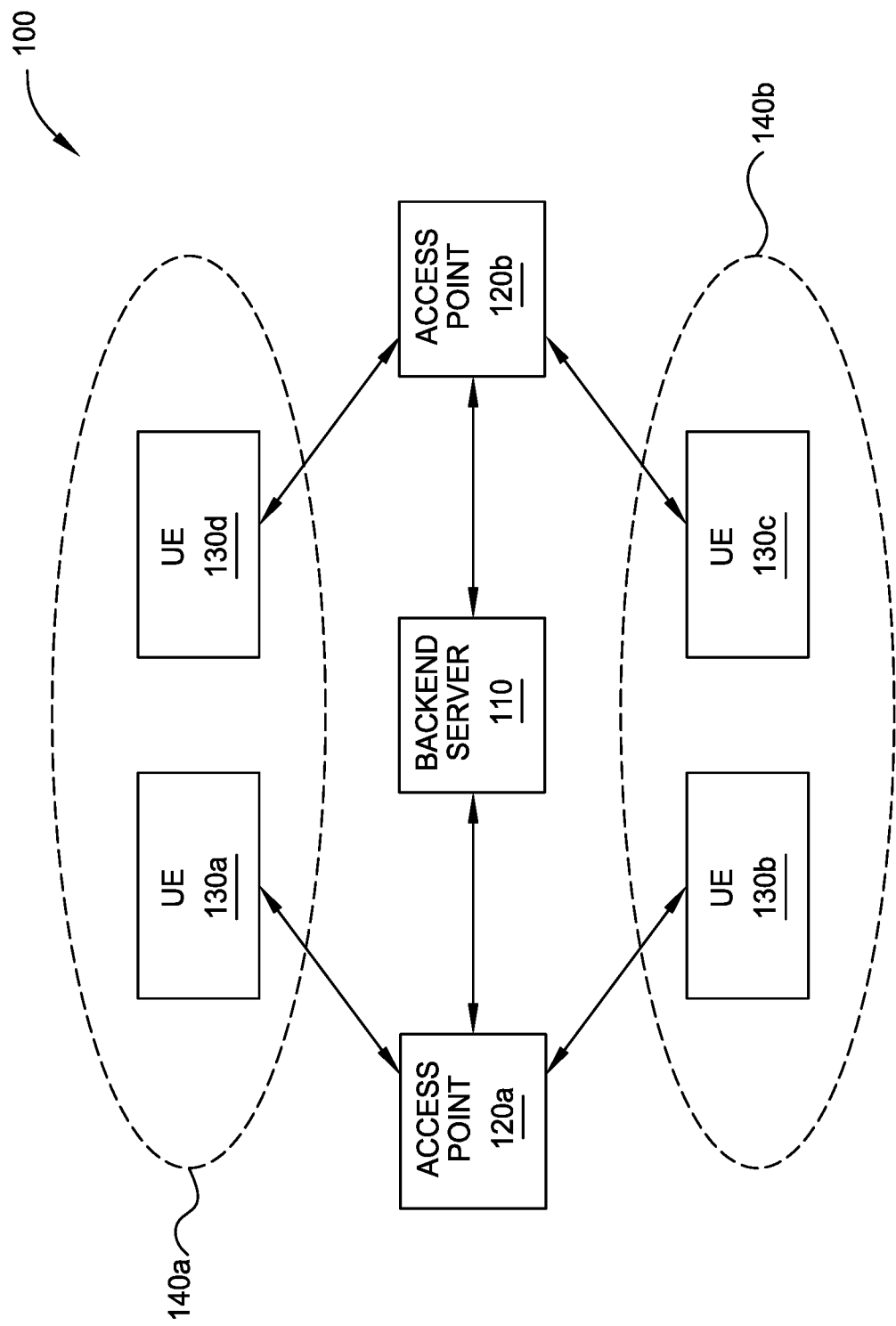
FIG. 1 illustrates an example network, according to aspects of the present disclosure.

One embodiment presented in this disclosure provides a method for assuring policy based alerting, the method comprising: clustering, via a first neural network, operational data reported from a network into a plurality of anomalies organized into geographic clusters, topological clusters, and call flow clusters; correlating, via the first neural network, alerts received from devices in the network according to the geographic clusters, the topological clusters, and the call flow clusters; determining, via the second neural network, anomaly impacts in the geographic clusters, the topological clusters, and the call flow clusters from the filtered alerts; in response to determining that the anomaly impacts for a first cluster exceed an alerting threshold: identifying a first shared node in the first cluster; identifying a second cluster including a second shared node matching the first shared node that has not been determined to exceed the alerting threshold; and transmitting an alert for the first cluster and the second cluster; and in response to receiving a response to the alert, updating, via the second neural network, the first neural network.

One embodiment presented in this disclosure provides a system for assuring policy based alerting, the system comprising: a processor; and a memory, including instructions that when performed by the processor enable the processor to: cluster, via a first neural network, operational data reported from a network into a plurality of anomalies organized into geographic clusters, topological clusters, and call flow clusters; correlate, via the first neural network, alerts received from devices in the network according to the geographic clusters, the topological clusters, and the call flow clusters; determine, via the second neural network, anomaly impacts in the geographic clusters, the topological clusters, and the call flow clusters from the filtered alerts; in response to determining that the anomaly impacts for a first cluster exceed an alerting threshold: identify a first shared node in the first cluster; identify a second cluster including a second shared node matching the first shared node that has not been determined to exceed the alerting threshold; and transmit an alert for the first cluster and the second cluster; and in response to receiving a response to the alert, update, via the second neural network, the first neural network.

One embodiment presented in this disclosure provides a non-transitory computer readable medium including processor executable instruction for performing an operation for assuring policy based alerting, the operation comprising: clustering, via a first neural network, operational data reported from a network into a plurality of anomalies organized into geographic clusters, topological clusters, and call flow clusters; correlating, via the first neural network, alerts received from devices in the network according to the geographic clusters, the topological clusters, and the call flow clusters; determining, via the second neural network, anomaly impacts in the geographic clusters, the topological clusters, and the call flow clusters from the filtered alerts; in response to determining that the anomaly impacts for a first cluster exceed an alerting threshold: identifying a first shared node in the first cluster; identifying a second cluster including a second shared node matching the first shared node that has not been determined to exceed the alerting threshold; and transmitting an alert for the first cluster and the second cluster; and in response to receiving a response to the alert, updating, via the second neural network, the first neural network.

Example Embodiments

Embodiments of the present disclosure provide for the dynamic management of a network and the alerts generated therein via the application of machine learning in an assurance system. The assurance system ingests data from throughout the network and analyzes the data to identify trends, anomalies, and automated actions that the assurance system can take. The assurance system clusters the data based on network topology, geography, and call flow to identify common sources for trends and anomalies, and adjust alerting thresholds on the fly to the system administrators based on the observed data. The machine learning algorithms used by the assurance system eschew conventional network management policies by operating via an unsupervised mode and providing management of minor alerts and escalation of major alerts without needing human input or a priori knowledge of the network and devices connected thereto. In various embodiments, the assurance system condenses or elects to not send alerts to an administrative user that the assurance system handles automatically or has clustered into a macro-alert or trend-alert; improving the relevance of alerts provided to administrative users and reducing bandwidth usage. Additionally, the assurance system improves the functionality of the network by, for example, dynamically adjusting the thresholds at which anomalies are treated as alert-worthy as devices join and leave the network; improving the flexibility of the network to handle various topologies and device setups. On review of the present disclosure, one of ordinary skill in the art will appreciate these and other benefits provided by the various embodiments described herein.

FIG. 1 illustrates an example network 100 with a set of several devices (and applications thereon) which may be organized by geography, topology, and call flow. As used herein, a geographic organization classifies devices/applications based on a physical location, a topological organization classifies devices/applications based on connections between devices in the network 100, and a call flow organization classifies devices/applications based on how the device/application communicates within the network 100, which may be based in part on the hardware and software of the devices thus organized.

In the illustrated network 100, a backend server 110 is in communication with a first access point 120a and a second access point 120b (generally, access point 120), which are in communication a first user equipment (UE) 130a and a second UE 130b, and a third UE 130c and a fourth UE 130d respectively (generally, UE 130). Each of the backend server 110, access points 120, and UE 130 are computing devices, which include at least a processor and a memory storage device that includes computer-readable instructions that are executable by the processor to provide the functionalities of the computing device. Example computing devices include, but are not limited to: smart phones, laptops, tablets, tower computers, server computers, routers, network switches, radio access devices, fiber optic transmission devices, and the like, which may be in communication via various wired and wireless transmission media via various standards of communication. The backend server 110 is a device or system that processes data through steps such as data ingest, data cleansing, data smoothing, feature selection, policy based alerting, communications routing, Service Level Agreement (SLA) management, etc. Examples of backend servers 110 include data system platforms, communications servers, website hosts, network switching fabrics, etc. The Access Points 120 are devices or systems that collect and provide wireline and wireless data and metadata for the UE 130 and backend servers 110 in WiFi, cellular systems, and the like. Examples of access points 120 may include wireless access points, cellular (e.g., eNodeB) access points, transport access points, wirelines systems, etc. Examples of UE 130 include cellphones, tablets, laptops, desktops, video game devices, smart watches/fitness trackers, etc.

As illustrated in FIG. 1, the first UE 130a and the second UE 130b are in communication with the first access point 120a which is in communication with the backend server 110, and the third UE 130c and the fourth UE 130d are in communication with the second access point 120b which is in communication with the backend server 110. Therefore, the network 100, when organized topologically, clusters the first UE 130a and the second UE 130b together based on the shared connection to the first access point 120a, and clusters the third UE 130c and the fourth UE 130d together based on the shared connection to the second access point 120b. Topographical clustering allows for propagated issues affecting service over the network 100 to be identified (e.g., hardware issues upstream affecting downstream devices, service bottlenecks)

When organizing the network geographically, the proximities and/or locations of the various devices are used to cluster those devices. As illustrated in FIG. 1, the first UE 130a and the fourth UE 130d are clustered together due to being located in a first geographic region 140a (generally, geographic region 140), and the second UE 130b and the third UE 130c are clustered together due to being located in a second geographic region 140b. The backend server 110 access points 120, if located in one of the geographic regions 140 may be clustered with one or more of the UE 130. In various embodiments, various geographic divisions used to organize and cluster devices may include, but are not limited to: buildings, campuses, neighborhoods, cities, regions, states/provinces, radii from a geographic coordinate or another device, and the like. Geographic clustering allows for regionalized issues affecting service over the network 100 to be classified (e.g., thunderstorms, power outages, high/low user density related to real-world events).

When organizing the network by call flows, the characteristics of the devices in the network are used to cluster those devices. As illustrated in FIG. 1, the first UE 130a and the third UE 130c are clustered together due to belonging to a first device type (e.g., tablets), and the second UE 130b and the fourth UE 130d are clustered together due to belonging to a second device type (e.g., smartphones). Call flow clustering allows for shared sources of issues affecting service over the network 100 to be classified. For example, a shared software application, operating system version, or device type may be associated with several devices exhibiting similar behaviors in the network 100. In another embodiment, the mode of operation of the devices may be used to organize the devices by call flow. For example, each of the UE 130a-d may be smartphones of the same type running the same operating systems and applications, but if the second UE 130b and the fourth UE 130d are engaged in a phone call, and the first UE 130a and the third UE 130c not engaged in a phone call (including being engaged in station keeping, Internet Protocol (IP) downloads or uploads, text messaging, etc.), then the two sets of devices may be divided into separate clusters based on the different call flows made by those devices.

Each cluster, whether organized by geography, network topology, or call flow includes the identities of the devices determined to belong to that cluster, as well as the communications pathways used or available to those devices, and each device may belong to several clusters or several types of clusters. Also included in each cluster is a shared device node that identifies the lowest-tiered device in the network topology that is shared by each communications pathways of the devices included in a particular cluster. For example, in the example clusters described above, the shared device node for a first topological cluster including UE 130a and UE 130b would be access point 120a, even though UE130a and UE 130b also share backend server 110 in the respective communication paths. Similarly, a shared device node for a first geographical cluster including UE 130a and UE 130d would be backend server 110, and a shared device node for a call flow cluster including UE 130a and UE 130d would be backend server 110.

The clustering of the various devices in the network 100 may be updated on a periodic basis (e.g., every s seconds), in response to a network event (e.g., a new access point 120 coming online), or a user command.

Figure 2:
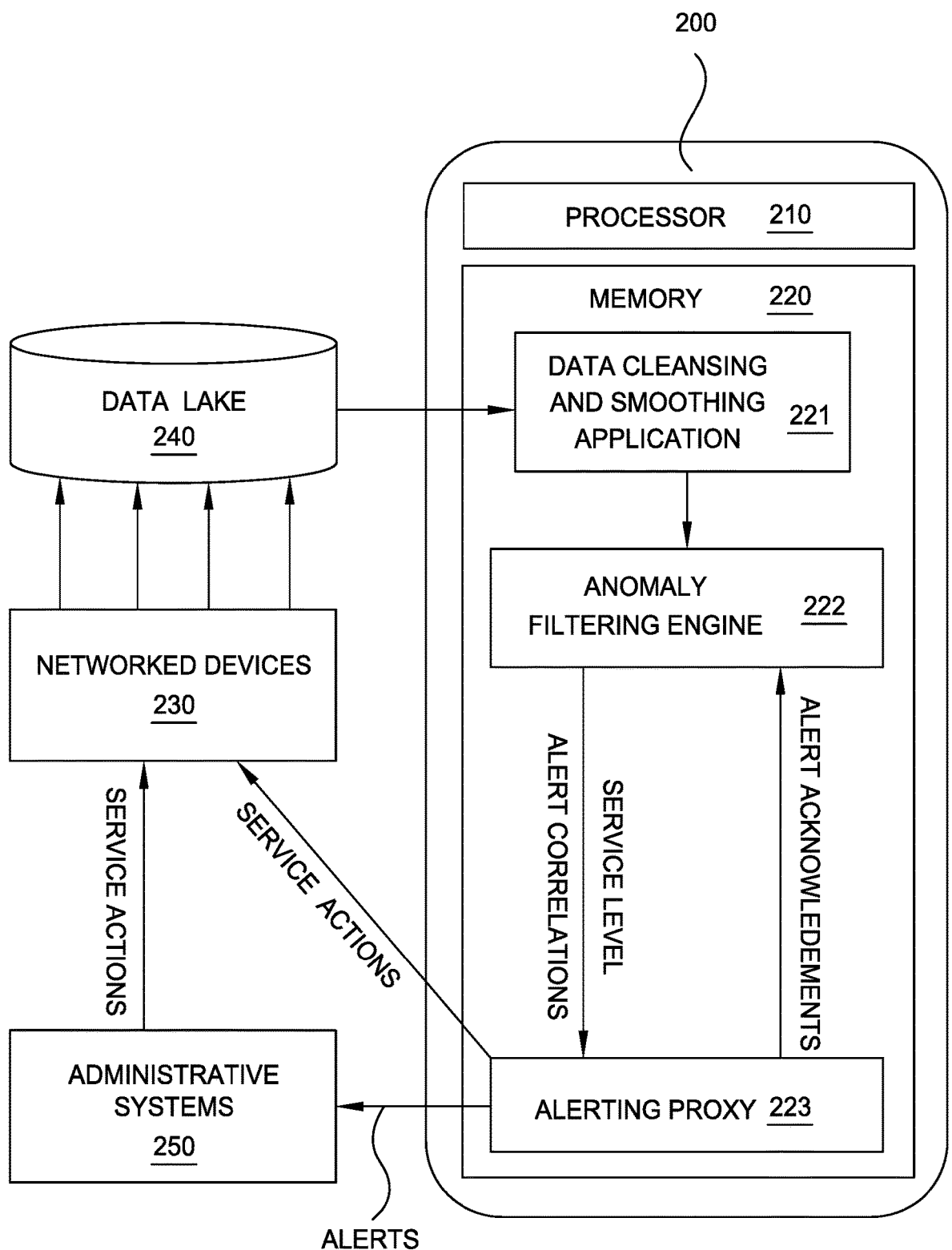
FIG. 2 illustrates an assurance system, according to aspects of the present disclosure.

FIG. 2 illustrates an assurance system 200, according to aspects of the present disclosure. As illustrated, the assurance system 200 includes a processor 210 and a memory 220, and is in communication with networked devices 230, a data lake 240, and administrative systems 250. Various networked devices 230 (i.e., devices connected to the network 100) provide operational data that are stored in the data lake 240, which are in turn analyzed by the assurance system 200 to determine whether to provide an alert to administrative systems 250 that can control and/or make changes to the networked devices 230 and the network 100, or automatically control and/or make changes to the networked devices 230 and the network 100 without alerting the administrative systems 250.

The networked devices 230 and administrative system 250 are computing devices that include processors and memory devices. In various embodiments, the assurance system 200, the data lake 240, and the administrative systems 250 are devices within the network 100, and may be deployed at one or more facilities of a network provider and in communication via the network 100. In some embodiments, the data lake 240 is a database provided on a separate device from the assurance system, while in other embodiments, the data lake 240 is included in the memory 220. In various embodiments, the networked devices 230 include devices in the separate domains, such as, for example, a mobility domain, an IP core domain, and data centers, which may include the devices used by end users, intermediary service providers, and the administrator of the network 100.

In the illustrated embodiment, the processor 210 retrieves and executes programming instructions stored in the memory 220 in association with operational data stored in the data lake 240. The processor 210 represents one or more central processing units (CPUs), which in turn may have one or more processing cores, and the like. The memory 220 is generally included to be representative of a random access memory (RAM), a disk drive, and/or flash-based storage device, and may include fixed and/or removable storage devices, such as fixed disk drives, removable memory cards, or optical storage, network attached storage (NAS), or storage area-network (SAN).

In one embodiment, the data lake 240 collects alerts and operational data from the network devices 230 via "smart pipes" defined in the service levels of the network 100 that are associated with an individual pipe. The operational data may include various Key Performance Indicators (KPI), which are quantifiable measures of the current state of the system from which the KPI is collected. KPIs include: capacity data, performance data, parameter audit data, traffic balancing data, telemetry, alerts and faults data, routing policy data, deep and shallow inspections, bandwidth use rate data, application performance, application faults, processor resource use rates, storage resource use rates, and the like. The assurance system 200 dynamically and automatically adjusts the thresholds at which the KPIs result in alerts based on trends and patterns in the KPI values, in order to ensure adequate monitoring. That is, embodiments of the present disclosure can prevent data points from being erroneously flagged as anomalous or non-anomalous, based on the current state of the network 100 and a learned history of the network 100. In some embodiments, anomalous data are flagged and an alert or indication is provided to an administrative system 250 for an administrative user to select an action to perform on the network 100 and/or various networked devices 230. In various embodiments, the assurance system 200 automatically selects an action to perform on the network 100 and/or various networked devices 230 in response to an indication of anomalous behavior in the network on one or more KPI. The assurance system 200 thus allows for more intelligent monitoring and maintenance of the network 100.

In the illustrated embodiment, the memory 220 includes a data cleansing and smoothing (DCSA) application 221, an anomaly filtering engine 222, and an alerting proxy 223. The DCSA 221 cleanses data in the data lake 240 to smooth and normalize data series for processing by the anomaly filtering engine 222. The anomaly filtering engine 222 processes data from the data lake 240 that have been cleansed to cluster the data points into various groupings of topological, geographic, and call flow clusters. Based on the cleansed data, the anomaly filtering engine 222 transmits service level alert correlated by the various clusters to the alerting neural network 223 to determine whether and how to respond to the correlated alerts. The alerting proxy 223 may respond to a correlated alert by: (1) ignoring the alert; (2) sending a command response to a networked device 230; or (3) forwarding an alert to an administrative system 250. The actions taken by the alerting proxy 223 are identified to the anomaly filtering engine 222 to improve future clustering and correlated alerts.

In various embodiments, the DCSA 221 cleanses the data in batches or in a stream, to smooth the data by identifying missing data points and providing a value for such missing data, and to normalize the data by identifying outliers in the data points and/or removing or flagging such outliers as anomalous. The DCSA 221 may include one or more neural networks trained to recognize missing data points and values to insert at those missing data points to smooth the data series or to recognize outliers that should be removed from the data series. In one embodiment, the DCSA 221 smooths the data via a Holt-Winters algorithm to compute a predicted value for the missing data point(s), which may be associated with a timestamp corresponding to the missing data, in order to mitigate the discontinuity in the received data points. In one embodiment, the DCSA 221 normalizes the data by an iterative method for estimating a mathematical model, which may include a low-pass filter or Kalman filter, a rate-of-change analysis, min-max normalization, Z-score normalization, and the like.

The anomaly filtering engine 222 may use one (or a combination of several) Deep Neural Network algorithms to cluster and detect anomalies with the clusters. Example DNN algorithms include, but are not limited to: Auto-Regressive Integrated Moving Average (ARIMA) applied to the cleansed data with mean-value shifting; K-means applied with the attributes used to cluster unlabeled cleansed data; Density Based Scan (DBScan) applied to discover clusters in large multi-dimensional spatial databases with noise, Long Short-Term Memory Units (LSTMs) applied to generate dynamic thresholds at which alerts are generated that take trends in the data into account. The anomaly filtering engine 222 may include several neural networks trained to perform different tasks on the data. For example, a first neural network is trained to identify geographic clusters, a second neural network is trained to identify topological clusters, and a third neural network is trained to identify call flow clusters.

The anomaly filtering engine 222 further uses a neural network with association rule mining algorithms to correlate and filter alerts from multiple domains to correlate related alerts in real-time to remove unwanted, false, or duplicative alerts, to detect root causes of alerts, and provide additional contextual information for the domain in the outputs. Association rule mining includes patterning mining to detect frequent events occurring together during a predefined window of time, event correlation to group related alerts into a single alert, and event prediction to predict a likelihood of a second event occurring within a time window of observing a first event. Events may be correlated into clusters based on call flows based on call-flow KPIs, network topology, and geographic locations of network elements.

The alert proxy 223 analyses the severity of impact of each alert on the network to determine whether an alerting threshold for the network has been satisfied. In various embodiments, the alert proxy 223 dynamically adjusts alert priorities based on the number of end users affects by the event, and may weight the end users based on priority levels. For example, a first event that affects N individual users may be judged less severe than a second event that affects N database users who are given a higher weight than individual users. In some embodiments, the alert proxy 223 prioritizes certain nodes in the network 100 based on throughput or subscriber count so that alerts including from these nodes are more likely to be prioritized for action by the alert proxy 223 or alerting to an administrative system 250.

In various embodiments, the alert proxy 223 is trained based on the historic actions of administrative user in response to various alerts. For example, an alert/action pair (including an action of no response) observed in at least p percent of historically observed occurrences is set as an automatic response for the alert proxy 223 to take, while an alert/action pair that is observed for less than p percent of historically observed occurrences is set to generate an alert for a user of an administrative system 250 to specify the action to take. In some embodiments, the alert proxy 223 alerts the administrative system 250 until a predefined number of actions for a given alert type are observed. Additionally, the alert proxy 223 may use a severity of the alert when determining whether to automatically address the alerting condition or to transmit an alert to an administrative system 250. For example, the alert proxy 223 may automatically respond to an alert of type X when fewer than N users are affected by the alert, but generates an alert for an administrative user to handle an alert of type X when N or more users are affected.

In various embodiments, one or more of the neural networks included in the anomaly filtering engine 222 and the alert proxy 233 are operated in an unsupervised state; with no external feedback. In practice, the anomaly filtering engine 222 and the alert proxy 223 work in conjunction to filter alerts with dynamically learned thresholds with no or minimal user interaction to remediate actual anomalies in the network 100. For example, the anomaly filtering engine 222 may receive operational data from various networked devices 230 that are cleansed to group various alerts into clusters. The anomaly filtering engine 222 may learn which operational data and from which sources are to be included in a cluster and which are to be ignored, and determine when to forward the alerts for a cluster to the alert proxy 223. The alerts identify various alarms, events (observed or predicted), and KPIs in the network 100 and the clusters (including the shared node) affected. The alert proxy 223 receives and adjusts the thresholds used by the anomaly filtering engine 222, alerts an administrative system 250 and/or another networked device 230, or proceeds without acting on the alert.

Figure 3:
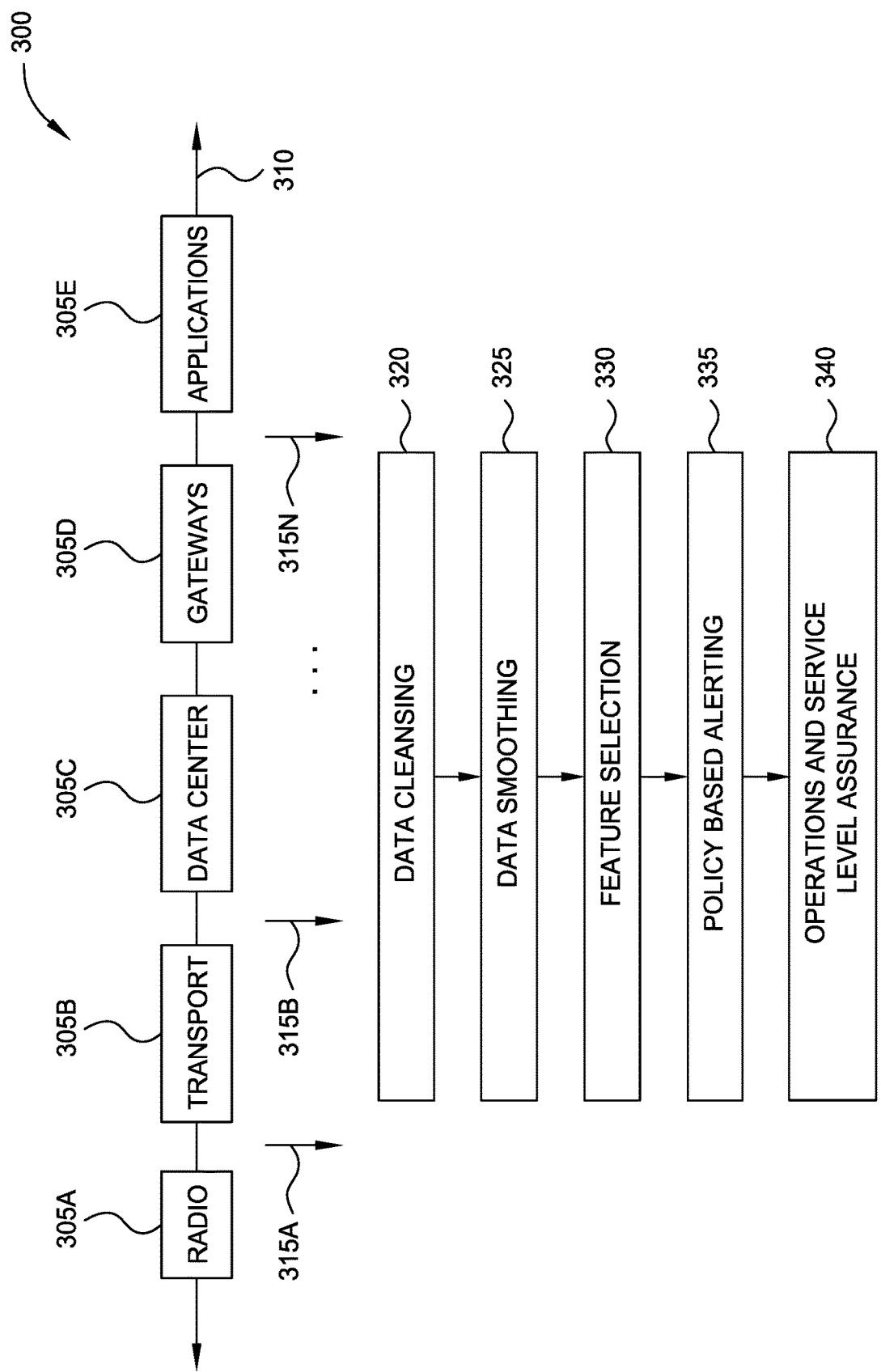
FIG. 3 illustrates an event flow for data collection and analysis using real-time adaptive thresholds, according to aspects of the present disclosure.

FIG. 3 illustrates a workflow 300 for data collection and analysis using real-time adaptive thresholds, according to one embodiment disclosed herein. In the illustrated workflow 300, a variety of Data Sources 305A-E provide the data to be analyzed. For example, in the illustrated embodiment, the Data Sources 305 include data sources for Radio 305A, Transport 305B, Datacenters 305C, Gateways 305D, and Applications 305E. As illustrated by the arrow 310, however, these example Data Sources 305 are not intended to be limiting, and any number of other data sources may be used in various embodiments.

In the illustrated embodiment, the data are collected via one or more Data Pipes 315A-n. These Data Pipes 315 can capture data from any data source 305 (and data of any type), and automate the process of collecting the data. In embodiments, the Data Pipes 315 further facilitate the storage, management, and transport of the data points from each Data Source 305. In the illustrated embodiment, the data points proceed through the Data Pipes 315 to a step for Data Cleansing 320. In one embodiment, the block 320 is performed by the DCSA 221. Frequently, data may be missing or inaccurate in some instances. This is particularly true in network operations scenarios, where raw data (such as telemetry or counters) can be missing or lost during transmission.

In an embodiment, the Data Cleansing block 320 involves detecting missing or inconsistent time-series data, which can skew the data set. In one embodiment, the Data Cleansing block 320 is performed via a Holt-Winters algorithm, to compute a predicted value for the missing data. This predicted data point can then be inserted into the data stream or batch data in the data lake 240. In one embodiment, the predicted data point is also associated with a timestamp corresponding to the missing data, in order to mitigate the discontinuity in the received data points.

In the illustrated embodiment, the data then proceed to a block 325 for Data Smoothing. In one embodiment, the Data Smoothing of block 325 is performed by the DCSA 221. In an embodiment, the Data Smoothing of block 325 ensures that outliers are removed from the data set, and only nominal values are passed to the machine learning algorithms (e.g., to the Machine Learning Models of the alerting proxy 223), which helps ensure that the models accurately represent the nominal state of the system. In one embodiment, the Data Smoothing of block 325 uses an iterative method for estimating a mathematical model to identify outliers. In some embodiments, this model can include a simple low pass filter, or a Kalman filter. In one embodiment, the Data Smoothing of block 325 involves analysis of the rate of change in the data values between each data point. In other embodiments, the Data Smoothing of block 325 can include min-max normalization, Z-score normalization, and the like.

In the illustrated workflow 300, once the Data Smoothing of block 325 is completed, the data proceeds to a stage for Feature Selection at block 330. In one embodiment, this stage is completed by the anomaly filtering engine 222. In an embodiment, the Data Selection of block 330 involves identifying and removing unneeded, irrelevant, and redundant attributes, parameters, and features from the data. In one embodiment, these features do not contribute to the accuracy of the predictive model, and may in fact decrease the accuracy of the model. In some embodiments, the Data Selection 330 includes selecting intervals of time and/or dates (e.g., times of day and/or days of the week) for processing.

As illustrated, the selected data then proceed for Policy Based Alerting at block 335. In an embodiment, the Policy Based Alerting of block 335 is performed by the alerting proxy 223. In an embodiment, the Policy Based Alerting of block 335 includes clustering the data points to identify anomalous data. In some embodiments, the Policy Based Alerting of block 335 further includes applying one or more Machine Learning Models to identify anomalous data. For example, in one embodiment, a Machine Learning Model is used to generate a predicted value for each data point, and this value is compared to the actual value of the data point to determine whether to generate an alert or act on an anomalous condition.

In the illustrated workflow 300, once the Policy Based Alerting of block 335 is complete, the alerts or actions for the anomalous condition proceed to block 340 for Operations and SLA Assurance. In one embodiment, this stage is completed by the alerting proxy 223. In an embodiment, the Operations and SLA Assurance of block 340 involves identifying which anomalous conditions require the attention of administrative users, and which can be acted on without further user input. The alerting proxy 340 forwards anomalous conditions requiring administrative attention to the administrative systems, and transmits commands to various networked devices 230 to affect the automated actions to ensure operations within operational and SLA parameters.

Figure 4:
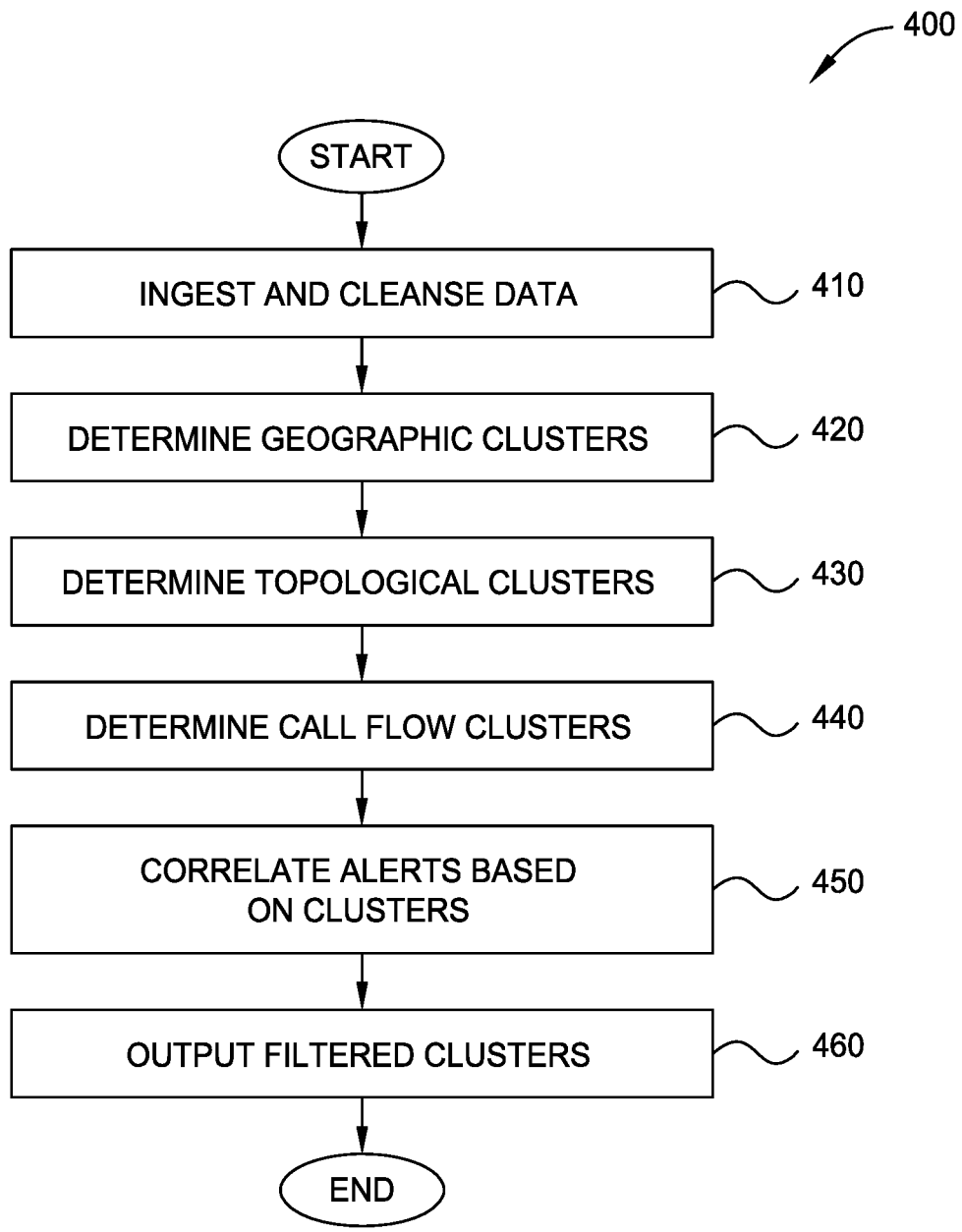
FIG. 4 is a flowchart of a method for clustering devices in a network, according to aspects of the present disclosure.

FIG. 4 is a flowchart of a method 400 for clustering devices in a network 100, according to aspects of the present disclosure. Method 400 begins with block 410, where the network 100 feeds data to a data lake 240 to ingest and for the DCSA 221 cleanse for processing. In various embodiments, smart pipes defined at the service level in the network 100 identify and collect specific KPIs from each of the networked devices 230, which are loaded into the data lake 240 for storage and pre-processing. The DCSA 221 may store the cleansed data back into the data lake 240, replacing normalized data points or adding data points to smooth time series missing actual operational data.

At block 420, the anomaly filtering engine 222 determines geographic clusters in the operational data. Various networked devices 230 may self-report a current geographic location based on locational tags (e.g., latitude and longitude coordinates, IP-geography mapping). In other embodiments, immobile networked devices 230 (e.g., access points, network switches, servers) may have an identifier mapped to a physical location of deployment. In some embodiments, the anomaly filtering engine 222 geographically clusters devices together that correspond to various real-world locations, such as a building, a neighborhood, a postal code, a city, a county, a region, a state/province, etc. In additional embodiments, the anomaly filtering engine 22 geographically clusters devices together that are organized into distinct groups with at least a predefined distance between the member devices of different groups. The geographic clusters may each include a similar number of devices (e.g., ±10%) or relate to a similar geographic area (e.g., $km^2$±10%, each cities, each states), and may also include clusters that include different numbers of devices or relate to distinct or overlapping geographic areas (e.g., neighborhoods and the counties/cities in which the neighborhoods are located)

At block 430, the anomaly filtering engine 222 determines topological clusters in the operational data. The anomaly filtering engine 222 determines various clusters in the organization of the network 100 based on shared infrastructure for the communication pathways from the devices assigned to end users to a backend of the network providing communication services to the end users. The network topologies may be organized by various points of shared communication within the network 100, including, but not limited to: access points, switches, servers, head-ends, trunk lines, etc. In various embodiments, the anomaly filtering engine 222 uses a different neural network to determine topological clusters than is used to identify geographic clusters.

At block 440, the anomaly filtering engine 222 determines call flow clusters in the operational data. The anomaly filtering engine 222 determines various shared features in the call flows for the various devices using the network 100. The features used to cluster may include device type, operating system type, active applications, operational mode, connection type (e.g., 3G versus 4G) and the like. In some embodiments, a LTSM is used to identify various data points in given communications session from those data points in another communications session as separate call flow clusters (e.g., a first download versus a second download). In various embodiments, the anomaly filtering engine 222 uses a different neural network to determine call flow clusters than is used to identify geographic clusters or topological clusters.

Each of the different clustering may include the same device multiple times. For example, the anomaly filtering engine 222 may associate alerts and operation data received from a particular device in a first geographical cluster, a second geographical cluster, a topological cluster, and a call flow cluster. The anomaly filtering engine 222 may periodically re-cluster the devices, such as, for example, a particular device of a mobile phone may be physically transferred to a new location and is re-clustered from a first topological cluster to a second topological cluster when the network 100 hands off the particular device from an access point in the first topological cluster to a new access point in the second topological cluster.

At block 450, the anomaly filtering engine 222 correlates the alerts based on the clusters. Alerts and anomalies detected from a particular device are assigned to the clusters that the particular device was determined to belong to in block 420, 430, and 440. The anomaly filtering engine 222 may aggregate the alerts received from each of the several devices belonging to a cluster so that the alert proxy 223 is provided with one (or fewer) alerts per cluster per alerting time period. For example, the anomaly filtering engine 222 identifies the shared node for clusters determined to satisfy the alerting threshold, and may filter the alerts to exclude duplicative alerts and to include missed alerts. For example, to exclude duplicative alerts, the anomaly filtering engine 222 may determine whether a first cluster of a given type includes a second cluster of the given type, and will only transmit the parent first cluster and not the child second cluster. In another example, the anomaly filtering engine 222 may determine that a first cluster of a first type has a shared node that matches the shared node of a second cluster of a second type and may include the second cluster in an alert due to the common shared node regardless of whether the second cluster satisfied the alerting threshold. In this way, the anomaly filtering engine 222 may provide proactive insights in detecting clusters affected by an anomaly.

At block 460, the anomaly filtering engine 222 outputs filtered alerts in response to a cluster satisfying an alerting threshold. In various embodiments, the anomaly filtering engine 222 sets the alerting threshold according to feedback from the alert proxy 223; raising the threshold when the alert is ignored, and lowering the threshold when the alert is forwarded to an administrative system 250 and/or acted on by the alert proxy 223.

Method 400 may then conclude.

Figure 5:
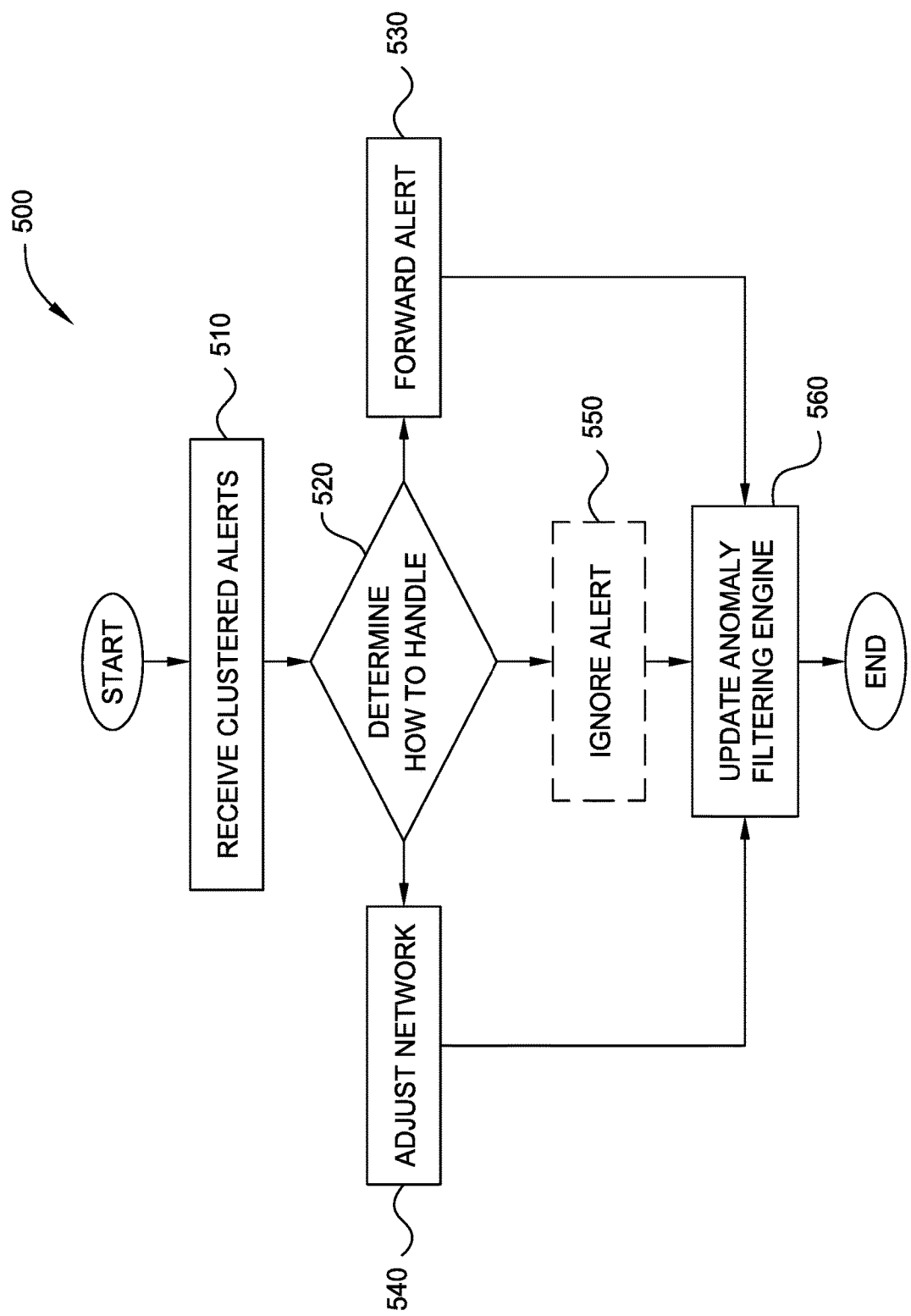
FIG. 5 is a flowchart for a method for managing alerts in a network, according to aspects of the present disclosure.

FIG. 5 is a flowchart for a method 500 for managing alerts in a network 100, according to aspects of the present disclosure. Method 500 begins with block 510, where the alert proxy 223 receives clustered alerts from the anomaly filtering engine 222. At block 520, the alert proxy 223 determines how to respond to a clustered alert received from the anomaly filtering engine 222. The alert proxy 223 may learn alert/action pairings from historic actions taken the administrative system 250 in response to prior actions. In various embodiments, when the confidence in an alert/action pair does not satisfy a confidence threshold, (e.g., when the alert proxy 223 has not seen sufficient examples of the alert/action pair to generalize a rule for how to proceed), method 500 proceeds to block 530. In additional embodiments, when the alert proxy 223 determines that a severity of the impact of the alert satisfies a severity threshold, method 500 proceeds to block 530 regardless of whether the confidence threshold is satisfied. When the confidence threshold is satisfied and the severity threshold is not satisfied, method 500 proceeds to block 540 or 550, based on whether the action specifies the alert proxy 223 to interact with a networked device (per block 540) or to ignore the alert (per block 550). In some embodiments, the alert proxy 223 determines whether the impact satisfies a triviality threshold, which indicates whether the impact related to the alert is de minimis and can be safely ignored until alerts with higher impacts have been handled, and proceeds to block 550 regardless of whether the confidence threshold is satisfied.

At block 530, in response to the determination made at block 520, the alert proxy 223 forwards the alert to an administrative system 250 in the network 100. In various embodiments, the alert proxy 223 condenses several alerts for different types of clusters into one alert based on a shared device node for the different alert referring to the same device. For example, when a first alert related to a geographic cluster identifies a particular device as the shared device node for the geographic cluster and a when a second alert related to a call flow cluster also identifies the particular device as the shared device node for the call flow cluster, the alert proxy 223 may forward one alert to an administrative system 250 identifying the particular device as a root cause or a common point of distress in the two clusters rather than sending two individual alerts. In some embodiments, the alert proxy 223 aggregates alerts from constituent clusters to further reduce the number of alerts passed onto an administrative system 250. For example, when a first alert related to a first geographic cluster and a second alert related to a second geographic cluster are received, the alert proxy 223 may determine whether the first geographic cluster is within the second geographic cluster (e.g., a first cluster for a city and a second cluster for a county in which the city is located), and may send only one of the two alerts. In some examples, in which the first cluster is deemed of greater interest or drives the behavior of the encompassing second cluster, the alert proxy 223 sends the alert for the first cluster to the administrative system 250. In other examples, in which the encompassing second cluster is deemed of greater interest or subsumes the behavior of the internal first cluster, the alert proxy 223 send the alert for the second cluster to the administrative system 250.

At block 540, in response to the determination made at block 520, the alert proxy 223 adjusts one or more networked devices 230 in response to the clustered alert. The alert proxy 223 may send commands to one or more networked devices 230 to shift loads in the network, deactivate a device, activate a device, move a device to/from a standby mode, update software running on a device, or quarantine devices within the network 100.

At block 550, in response to the determination made a block 520, the alert proxy 223 ignores the alert (i.e., takes an "action" of no action). In some embodiments, when ignoring an alert, the alert proxy 223 neither forwards the alert to an administrative system 250 nor adjusts a networked device 230, and method 500 may proceed to block 560, where the chosen course of action is used to update the anomaly filtering engine 222.

At block 560, alert proxy 223 indicates the course of action selected at block 520 to update the anomaly filtering engine 222. The neural network(s) of the anomaly filtering engine 222 receive the feedback from the alert proxy 223 to adjust how future alerts are generated. In one example, the anomaly filtering engine 222 uses the alerts forwarded to the administrative devices (per block 530) and the networked devices 230 adjusted by user commands to adjust how the networked devices 230 are clustered or which shared nodes are associated with alerts. In another example, the anomaly filtering engine 222 uses alerts handled by the alert proxy 223 and the networked devices 2330 automatically adjusted to adjust how the networked devices 230 are clustered or which shared nodes are associated with alerts. In a further example, feedback from a course of action to ignore the alert (per block 550) is used to raise the thresholds used by the anomaly filtering engine 222 to determine when to generate an alert; saving bandwidth and processing resources by not generating alerts that will be ignored.

Method 500 may then conclude.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method, comprising:
training a first neural network to cluster devices into geographic clusters based on physical location of the devices;
training a second neural network, distinct from the first neural network, to cluster the devices into topological clusters based on connections between the devices in a network;
training a third neural network, distinct from the first and second neural networks, to cluster devices into call flow clusters based on device type, wherein the first neural network, the second neural network, and the third neural network form an anomaly filtering engine;
clustering, in real-time, using the anomaly filtering engine, devices in the network based on operational data reported from the network into a set of geographic clusters, a set topological clusters distinct from the set of geographic clusters, and a set of call flow clusters distinct from the set of geographic clusters and the set of topological clusters;
correlating, in real-time, via the anomaly filtering engine, alerts received from devices in the network according to the set of geographic clusters, the set of topological clusters, and the set of call flow clusters;
detecting, in real-time, via a fourth neural network, anomaly impacts in the set of geographic clusters, the set of topological clusters, and the set of call flow clusters from the alerts, wherein the anomaly impacts comprise network conditions affecting an operation of the network;

in response to determining that the anomaly impacts for a first geographic cluster, of the set of geographic clusters, exceed an alerting threshold:
   identifying, in real-time, a first device of a first plurality of devices in the first geographic cluster, wherein the first device corresponds to a lowest-tiered device in a network topology of the network where communications pathways of the first plurality of devices in the first geographic cluster pass through the lowest-tiered device;
   identifying, in real-time, a first call flow cluster, of the set of call flow clusters, that includes the first device, wherein the anomaly impacts for the first call flow cluster have not been determined to exceed the alerting threshold, wherein the first call flow cluster comprises a second plurality of devices including the first device, wherein the second plurality of devices comprises at least one device outside of the first plurality of devices, and wherein communications pathways of the second plurality of devices in the first call flow cluster pass through the lowest-tiered device; and
   transmitting, in real-time, an alert indicating the anomaly impacts for both the first geographic cluster and the first call flow cluster; and
in response to receiving a response to the alert, updating, in real-time, via the fourth neural network, the anomaly filtering engine wherein the updates to anomaly filtering engine adjust how the first neural network, the second neural network, and the third neural network identify clusters in the operational data.

2. The method of claim 1, wherein the operational data is gathered via data pipelines defined in the network for associated Key Performance Indicators that store the operational data in a data lake accessible to the first neural network for a predetermined length of time.

3. The method of claim 1, wherein a device represented by a first shared node in the first geographic cluster is also included as a non- shared node in a second geographic cluster, wherein the alert does not include the second geographic cluster.

4. The method of claim 1, further comprising:
prior to clustering the operational data:
   normalizing the operational data by removing outliers from the operational data; and
   smoothing the operational data by adding predicted data points to represent data points missing from the operational data.

5. The method of claim 1, wherein the second neural network generates the response to the alert without user input, further comprising:
   transmitting the response to at least one device included in the first geographic cluster.

6. The method of claim 1, wherein the alerting threshold is dynamically adjusted based on a number of end users affected by a given alert.

7. A system, comprising:
a processor; and
a memory, including instructions that when performed by the processor enable the processor to:
   train a first neural network to cluster devices into geographic clusters based on physical location of the devices;
   train a second neural network, distinct from the first neural network, to cluster the devices into topological clusters based on connections between the devices in a network;
   train a third neural network, distinct from the first and second neural networks, to cluster devices into call flow clusters based on device type, wherein the first neural network, the second neural network, and the third neural network form an anomaly filtering engine;
   cluster, in real-time, via using the anomaly filtering engine, devices in the network based on operational data reported from the network into a set of geographic clusters, a set topological clusters distinct from the set of geographic clusters, and a set of call flow clusters distinct from the set of geographic clusters and the set of topological clusters;
   correlate, in real-time, via the anomaly filtering engine, alerts received from devices in the network according to the set of geographic clusters, the set of topological clusters, and the set of call flow clusters;
   detect, in real-time, via a fourth neural network, anomaly impacts in the set of geographic clusters, the set of topological clusters, and the set of call flow clusters from the alerts, wherein the anomaly impacts comprise network conditions affecting an operation of the network;
   in response to determining that the anomaly impacts for a first geographic cluster, of the set of geographic clusters, exceed an alerting threshold:
      identify, in real-time, a first device of a first plurality of devices in the first geographic cluster, wherein the first device corresponds to a lowest-tiered device in a network topology of the network where communications pathways of the first plurality of devices in the first geographic cluster pass through the lowest-tiered device;
      identify, in real-time, a first call flow cluster, of the set of call flow clusters, that includes the first device, wherein the anomaly impacts for the first call flow cluster have not been determined to exceed the alerting threshold, wherein the first call flow cluster comprises a second plurality of devices including the first device, wherein the second plurality of devices comprises at least one device outside of the first plurality of devices, and wherein communications pathways of the second plurality of devices in the first call flow cluster pass through the lowest-tiered device; and
      transmit, in real-time, an alert indicating both the first geographic cluster and the first call flow cluster; and
   in response to receiving a response to the alert, update, in real-time, via the fourth neural network, the anomaly filtering engine wherein the updates to anomaly filtering engine adjust how the first neural network, the second neural network, and the third neural network identify clusters in the operational data.

8. The system of claim 7, wherein the operational data is gathered via data pipelines defined in the network for associated Key Performance Indicators that store the operational data in a data lake accessible to the first neural network for a predetermined length of time.

9. The system of claim 7, wherein a device represented by a first shared node of the first geographic cluster is also included as a non- shared node in a second geographic cluster, wherein the alert does not include the second geographic cluster.

10. The system of claim 7, further comprising:
prior to clustering the operational data, the instructions further enable the processor to:
normalize the operational data by removing outliers from the operational data; and
smooth the operational data by adding predicted data points to represent data points missing from the operational data.

11. The system of claim 7, wherein the second neural network generates the response to the alert without user input, and the instructions further enable the processor to:
transmit the response to at least one device included in the first geographic cluster.

12. The system of claim 7, wherein the instructions further enable the processor is to dynamically adjusted the alerting threshold based on a number of end users affected by a given alert.

13. A non-transitory computer readable medium including processor executable instruction for performing an operation, comprising:
training a first neural network to cluster devices into geographic clusters based on physical location of the devices;
training a second neural network, distinct from the first neural network, to cluster the devices into topological clusters based on connections between the devices in a network;
training a third neural network, distinct from the first and second neural networks, to cluster devices into call flow clusters based on device type, wherein the first neural network, the second neural network, and the third neural network form an anomaly filtering engine;
clustering, in real-time, using the anomaly filtering engine, devices in the network based on operational data reported from the network into a set of geographic clusters, a set topological clusters distinct from the set of geographic clusters, and a set of call flow clusters distinct from the set of geographic clusters and the set of topological clusters;
correlating, in real-time, via the anomaly filtering engine, alerts received from devices in the network according to the set of geographic clusters, the set of topological clusters, and the set of call flow clusters;
detecting, in real-time, via a fourth neural network, anomaly impacts in the set of geographic clusters, the set of topological clusters, and the set of call flow clusters from the alerts, wherein the anomaly impacts comprise network conditions affecting an operation of the network;
in response to determining that the anomaly impacts for a first geographic cluster, of the set of geographic clusters, exceed an alerting threshold:
identifying, in real-time, a first device of a first plurality of devices in the first geographic cluster, wherein the first device corresponds to a lowest-tiered device in a network topology of the network where communications pathways of the first plurality of devices in the first geographic cluster pass through the lowest-tiered device;
identifying, in real-time, a first call flow cluster, of the set of call flow clusters, that includes the first device, wherein the anomaly impacts for the first call flow cluster have not been determined to exceed the alerting threshold, wherein the first call flow cluster comprises a second plurality of devices including the first device, wherein the second plurality of devices comprises at least one device outside of the first plurality of devices, and wherein communications pathways of the second plurality of devices in the first call flow cluster pass through the lowest-tiered device; and
transmitting, in real-time, an alert indicating both the first geographic cluster and the first call flow cluster; and
in response to receiving a response to the alert, updating, in real-time, via the fourth neural network, the anomaly filtering engine wherein the updates to anomaly filtering engine adjust how the first neural network, the second neural network, and the third neural network identify clusters in the operational data.

14. The non-transitory computer readable medium of claim 13, wherein the operational data is gathered via data pipelines defined in the network for associated Key Performance Indicators that store the operational data in a data lake accessible to the first neural network for a predetermined length of time.

15. The non-transitory computer readable medium of claim 13, wherein a device represented by a first shared node of the first geographic cluster is also included as a non-shared node in a second geographic cluster, wherein the alert does not include the second geographic cluster.

16. The non-transitory computer readable medium of claim 13, further comprising:
prior to clustering the operational data:
normalizing the operational data by removing outliers from the operational data; and
smoothing the operational data by adding predicted data points to represent data points missing from the operational data.

17. The non-transitory computer readable medium of claim 13, wherein the second neural network generates the response to the alert without user input, further comprising:
transmitting the response to at least one device included in the first geographic cluster.

18. The non-transitory computer readable medium of claim 13, wherein the alerting threshold is dynamically adjusted based on a number of end users affected by a given alert.

19. The method of claim 1, further comprising in response to receiving the alert, adjusting the first plurality of devices to at least one of: shift loads in the network, deactivate one of the first plurality of devices, activate one of the first plurality of devices, move one of the first plurality of devices to or from a standby mode, update software running on one of the first plurality of devices, or quarantine one of the first plurality of devices within the network.

20. The system of claim 7, further comprising in response to receiving the alert, adjusting the first plurality of devices to at least one of: shift loads in the network, deactivate one of the first plurality of devices, activate one of the first plurality of devices, move one of the first plurality of devices to or from a standby mode, update software running on one of the first plurality of devices, or quarantine one of the first plurality of devices within the network.

* * * * *